US008515849B2

(12) United States Patent
Sagi et al.

(10) Patent No.: US 8,515,849 B2
(45) Date of Patent: Aug. 20, 2013

(54) TECHNIQUES FOR PRODUCING RELATIVE PERFORMANCE BASED INDEXES WITH CORRESPONDING TRADABLE FINANCIAL PRODUCTS

(75) Inventors: Jacob S. Sagi, Nashville, TN (US); Robert E. Whaley, Nashville, TN (US)

(73) Assignee: The NASDAQ OMX Group, Inc., New York, NY (US)

( * ) Notice: Subject to any disclaimer, the term of this patent is extended or adjusted under 35 U.S.C. 154(b) by 75 days.

(21) Appl. No.: 12/981,825

(22) Filed: Dec. 30, 2010

(65) Prior Publication Data

US 2012/0066148 A1 Mar. 15, 2012

Related U.S. Application Data

(60) Provisional application No. 61/381,857, filed on Sep. 10, 2010.

(51) Int. Cl.
*G06Q 40/00* (2012.01)
*G06Q 40/06* (2012.01)
*G06Q 40/04* (2012.01)

(52) U.S. Cl.
CPC ............... *G06Q 40/00* (2013.01); *G06Q 40/06* (2013.01); *G06Q 40/04* (2013.01)
USPC ......................................... 705/36 R; 705/35

(58) Field of Classification Search
CPC ........ G06Q 40/00; G06Q 40/04; G06Q 40/06
USPC .......................................... 705/36, 35, 36 R
See application file for complete search history.

(56) References Cited

U.S. PATENT DOCUMENTS

| | | | | |
|---|---|---|---|---|
| 6,236,980 | B1 * | 5/2001 | Reese | 705/36 R |
| 2004/0117291 | A1 * | 6/2004 | O'Callahan | 705/37 |
| 2009/0012911 | A1 * | 1/2009 | Segaud et al. | 705/36 R |

OTHER PUBLICATIONS

Giliberto, M. (1997). A performance benchmark for commercial mortgages. Real Estate Finance, 13(4), 68-75. Retrieved Apr. 1, 2013.*

* cited by examiner

*Primary Examiner* — Kito R Robinson
(74) *Attorney, Agent, or Firm* — Nixon & Vanderhye P.C.

(57) ABSTRACT

Techniques are described for constructing benchmark-adjusted relative performance indexes that reflect total performance of a traded, target security relative to a benchmark instrument. Also described are derivative instruments such as exchange-traded futures and options that allow investors to take precise hedging or speculation positions on target security relative to the benchmark instrument.

37 Claims, 7 Drawing Sheets

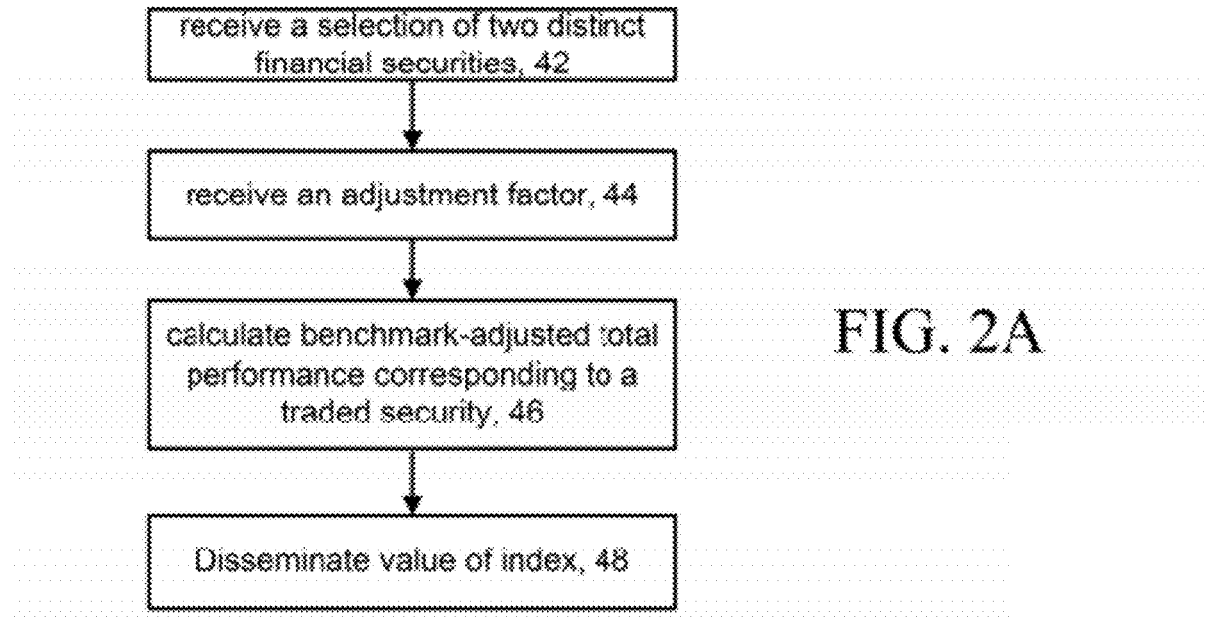

TECHNIQUES FOR PRODUCING RELATIVE PERFORMANCE BASED INDEXES WITH CORRESPONDING TRADABLE FINANCIAL PRODUCTS

Under 35 U.S.C. §119(e)(1), this application claims the benefit of prior U.S. provisional application 61/381,857, filed Sep. 10, 2010, the contents of which are incorporated herein by reference in their entirety.

BACKGROUND

This invention relates to financial indexes and products derived therefrom.

Stock indexes are used to track the performance of a group of stocks. Similarly other types of indexes are known such as those that track performance of other types of financial instruments. Financial products such as index-based mutual funds or index based exchange traded funds (ETFs) allow an investor to invest in a single investment instrument that tracks the performance of an underlying index. One example of an index fund is a Standard & Poor's Depository Receipt ("SPDR"). An SPDR is a type of security known as a portfolio depository receipt (an Exchange Traded Fund), which represents an undivided ownership interest in a portfolio of stocks held by the SPDR Trust. The SPDR Trust holds a portfolio of stocks that is intended to mirror, track, or generally correspond to the price and/or yield performance of the S&P 500 Index. Securities, like SPDRs, trade on a stock exchange, a securities market or an electronic communication network.

Index futures contracts and index options provide other approaches for investors to invest, trade, or hedge based on the performance of an index. An index futures contract is a futures contract on a financial index such as the S&P 500 index, whereas index options are instruments that give the holder the right to receive cash settlements based on changes in the underlying index on which the option is based. A call index option would ordinarily give a payout if the index rises above its strike price, whereas a put index option would give a payout if the index falls, below its strike price.

SUMMARY

While various financial instruments are known, generally none of such exchange traded instruments provide an investor with direct exposure to a comparative performance of one security to another, different security.

Described are a family of indexes along with derivative instruments, e.g., exchange-traded options and futures instruments whose underlying payoffs are based on valuations of algorithmically determined relative performance indexes. Each such novel index is constructed to track comparative performance of a traded financial instrument, such as a security vs. that of a second financial instrument, i.e., a benchmark (reference security). The derivative products provide a return, based on the level of the constructed index. In general, any traded security can be used with any benchmark security. The indexes are algorithmically constructed indexes and are referred to herein as "algorithmically constructed relative performance indexes" or (ACRP) indexes.

According to an aspect of the present invention, a computer implemented method includes determining by one or more computers, a value for a relative performance index, the relative performance index based on prices of a security and a benchmark security that is different from the security and with the security and the benchmark security traded on trading venues and having prices that are publicly observable and available from the respective trading venues; and with the value of the relative performance index being determined by the computer by multiplying, by the one or more computers, a previous relative performance index value by two ratios, the first ratio related to a current price for the security divided by a previous price for the security, and the second ratio related to a previous price of the benchmark security divided by a current price of the benchmark security.

The following are embodiments within the scope of the invention.

The method includes adding by the one or more computers any income from either the security or the benchmark security to the respective prices of the respective securities, prior to dividing. The method includes raising by the one or more computers the second ratio by an exponent that corresponds to an adjustment factor for the second ratio. The adjustment factor is a constant value. The adjustment factor is determined by an algorithm based on publicly available information. The one or more computers that determine a value for the relative performance index, determine values for plural relative performance indexes for corresponding plural, different pairs of traded securities and benchmark securities. The one or more computers periodically disseminate values for the relative performance index. The method includes producing derivative contracts based on the relative performance index. The derivative contracts are futures contracts. The derivative contracts are options contracts.

According to an additional aspect of the invention, a computer program product is tangibly embodied on a computer readable storage device. The computer program product is for administrating benchmark indexes and comprises instructions for causing a computer to determine a value for a relative performance index, the relative performance index based on prices of a security and a benchmark security that is different from the security, receive prices for the security and the benchmark security based on trading of the securities on trading venues; and multiply a previous relative performance index value by two ratios, the first ratio related to a current price for the security divided by a previous price for the security, and the second ratio related to a previous price of the benchmark security divided by a current price of the benchmark security.

The following are embodiments within the scope of the invention.

The computer program product further includes instructions to add any income attributable to either the security or the benchmark security to the respective prices of the respective securities, prior to executing instructions to divide. The computer program product further includes instructions to raise the second ratio by an exponent that corresponds to an adjustment factor for the second ratio. The adjustment factor is a constant value. The adjustment factor is determined by an algorithm based on publicly available information. The computer program product further includes instructions to determine values for plural relative performance indexes for corresponding plural, different pairs of traded securities and benchmark securities. The computer program product further includes instructions to cause one or more computers to periodically disseminate values for the relative performance index.

According to an additional aspect of the invention, a computer program product tangibly embodied on a computer readable storage device includes instructions for causing a computer to receive a value for a relative performance index, the relative performance index value based on prices of a security and a benchmark security that is different from the security that is derived from multiplying a previous relative performance index value by two ratios, the first ratio related to a current price for the security divided by a previous price for the security, and the second ratio related to a previous price of the benchmark security divided by a current price of the benchmark security, determine a first one of an initial strike price for option contracts or an initial mark to market price for futures contracts that are set to bracket a current value of the index in increments of currency; and generate derivative contacts with an initial price that based at least in part on the value of the relative performance index.

The following are embodiments within the scope of the invention.

The derivative contracts are futures contracts. The derivative contracts are options contracts.

According to an additional aspect of the invention, a computer system includes a processor, memory coupled to the processor and a computer readable storage medium storing a computer program product for administrating benchmark indexes and derivative products. The program comprises instructions for causing the computer to determine a value for a relative performance index, the relative performance index based on prices of a security and a benchmark security that is different from the security, receive prices for the security and the benchmark security based on trading of the securities on trading venues; multiply a previous relative performance index value by two ratios, the first ratio related to a current price for the security divided by a previous price for the security, and the second ratio related to a previous price of the benchmark security divided by a current price of the benchmark security.

The following are embodiments within the scope of the invention.

The system further includes instructions to add any income attributable to either the security or the benchmark security to the respective prices of the respective securities, prior to executing instructions to divide. The system further includes instructions to raise the second ratio by an exponent that corresponds to an adjustment factor for the second ratio. The adjustment factor is a constant value. The adjustment factor is determined by an algorithm based on publicly available inputs. The system further includes instructions to determine values for plural relative performance indexes for corresponding plural, different pairs of traded securities and benchmark securities. The system further includes instructions to cause the system to periodically disseminate values for the relative performance index. The system further includes instructions to record derivative contracts based on the relative performance index. The derivative contracts are futures contracts. The derivative contracts are options contracts.

According to an additional aspect of the invention, a computer implemented method, includes recording by one or more computers, receipt of margin for a first position in a derivative instrument that derives its value from a relative performance index, the relative performance index based on prices of a publically traded security and a publically traded benchmark security that is different from the publically traded security; and recording by the one or more computers, receipt of margin for a second, contra-position in derivative instrument that derives its value from the same relative performance index; and issuing derivative contracts.

The following are embodiments within the scope of the invention.

The method includes periodically valuing the relative performance index that the derivative instruments derive values from by multiplying by the one or more computers a previous relative performance index value by two ratios, the first ratio related to a current price for the security divided by a previous price for the security, and the second ratio related to a previous price of the benchmark security divided by a current price of the benchmark security. Periodically valuing further includes adding by the one or more computers any income from either the security or the benchmark security to the respective prices of the respective securities, prior to dividing. Periodically valuing further includes raising by the one or more computers the second ratio by an exponent that corresponds to an adjustment factor for the second ratio.

According to an additional aspect of the present invention, a computer program product tangibly embodied on a computer readable storage medium for administrating derivative products includes instructions for causing a computer to record receipt of a first position in a derivative instrument that derives its value from a relative performance index, the relative performance index based on prices of a publically traded security and a publically traded benchmark security that is different from the publically traded security; and record receipt of a second, contra-position in derivative instrument that derives its value from the same relative performance index; and periodically calculating a value of the relative performance index that the derivative instruments derive values from by instructions that execute the following algorithm:

$$I_{t+1} = I_t \times \frac{P_{t+1,S}}{P_{t,S}} \times \left(\frac{P_{t,M}}{P_{t+1,M}}\right)^{\beta_t}$$

where $\beta_t$ is an adjustment factor set to be a constant or is algorithmically determined P are published prices, t is a time period and I is price of the index, S, is the traded security and M is the benchmark security.

The following are embodiments within the scope of the invention.

The computer program product further comprising adding income to the algorithm for periodically calculating the value of the relative performance index is according to instructions that execute the algorithm modified by the added income, as:

$$I_{t+1} = I_t \times \frac{P_{t+1,S} + D_{t+1,S}}{P_{t,S}} \times \left(\frac{P_{t,M}}{P_{t+1,M} + D_{t+1,M}}\right)^{\beta_t}$$

where $D_{t+1,S}$ and $D_{t+1,M}$ are attributable incomes to the respective securities S and M.

According to an additional aspect of the present invention, a computer implemented method includes receiving by one or more computers a selection from an investor of two distinct securities, with one security being a target security and the other being a benchmark security, determining by one or more computers a relative performance index based on prices of the target security and the benchmark security; and disseminating by the one or more computers values for the relative performance index.

The following are embodiments within the scope of the invention.

The method includes determining the value of the relative performance index by multiplying by the one or more computers a previous relative performance index value by two ratios, the first ratio related to a current price for the security divided by a previous price for the security, and the second ratio related to a previous price of the benchmark security divided by a current price of the benchmark security. The method further includes adding by the one or more computers any income from either the security or the benchmark security to the respective prices of the respective securities, prior to dividing; and raising by the one or more computers the second ratio by an exponent that corresponds to an adjustment factor for the second ratio. The method further includes generating derivative products based on the relative performance index. The method further includes receiving by the one or more computers plural selections comprising plural pairs of distinct securities, with one security in each of the plural pairs being a target security and the other security in each of the plural pairs being a benchmark security and determining by the one or more computers corresponding relative performance indexes based on prices of the target security and the benchmark security for the pairs of securities.

According to an additional aspect of the present invention, a computer implemented method includes receiving by one or more computers a selection from an investor of two distinct securities, with one security being a target security and the other being a benchmark security, determining by one or more computers a relative performance index based on prices of the target security and the benchmark security by:

$$I(b)_{t+\Delta t} = I(b)_t \times \frac{\left(\frac{S_{t+\Delta t} + D_{S,t+\Delta t}}{S_t}\right)}{\left(\frac{M_{t+\Delta t} + D_{M,t+\Delta t}}{M_t}\right)^b}$$

where b is a relative risk-adjustment coefficient, $$\left(\frac{S_{t+\Delta t} + D_{S,t+\Delta t}}{S_t}\right)$$

is the total realized return of holding security S over the instant between t and t+Δt, and $$\left(\frac{M_{t+\Delta t} + D_{M,t+\Delta t}}{M_t}\right)^b$$

is the total realized return of holding security M over the instant between t and t+Δt, raised to the power b; and disseminating by the one or more computers values for the relative performance index.

BRIEF DESCRIPTION OF THE DRAWINGS

The foregoing features and other aspects of the invention will be better understood when taken in conjunction with the accompanying drawings, in which:

FIGS. 2A-2C are flow charts depicting processes for constructing/valuing a relative performance index and use of such an index.

DETAILED DESCRIPTION

Figure 1:
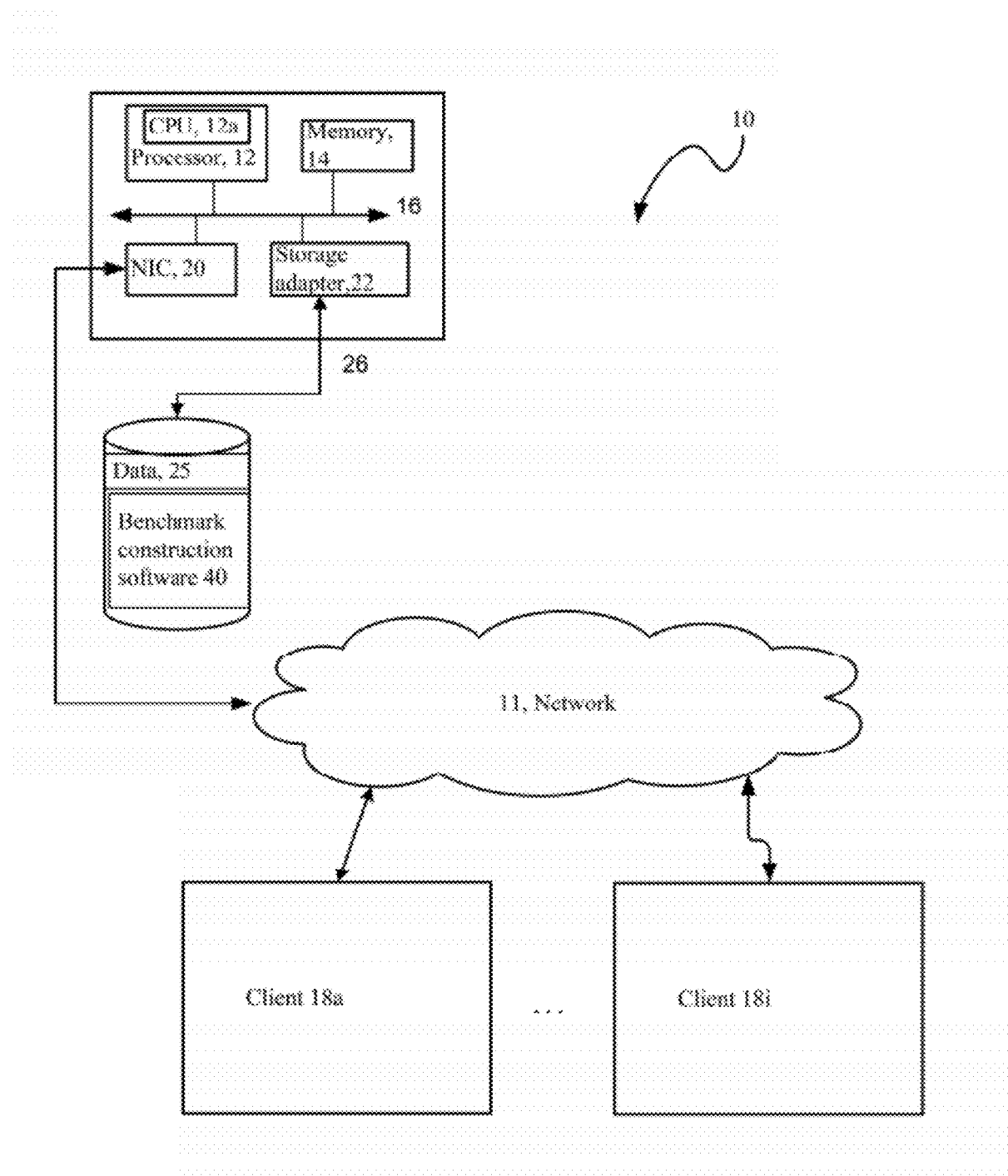
FIG. 1 is a block diagram of a network of computer systems.

Referring now to FIG. 1, a network 10 of computer systems includes a plurality of computers 12 each including a processor 12a including a central processor unit and a main memory 14 interconnected by a computer system bus 16. One or more of the computers can be a server-type computer. Each of the computers 12 in the network 10 of computer systems has a network interface 20 coupled via a network 11 (either a private or public network) to the other computer systems (clients 18a-i). The computer systems each further include a storage adapter 22 coupled to the computer system bus 16 and coupled to a mass storage device, e.g., disk drive 24 via a storage bus 26.

The computer systems 12 receive current information regarding prices, number of outstanding shares, etc. of stocks, commodities or other types of financial products that are traded on exchanges, markets, matching networks or similar trading venues. This information is communicated over the network 11. The information can be stored as a file or data structure or in databases, 25 etc. on the mass storage device, e.g., disk drive 24.

The above-described architecture is that of a general purpose, networked computer system. It should be understood that any type of computer system such as a server or non-network personal computer system provided with the information could be used to operate the relative performance index construction software.

The mass storage device 24 also includes relative performance index construction software 40. The relative performance index construction software 40 uses information in the file or database or data structure 25 to produce algorithmically constructed relative performance indexes (ACRP) indexes for use in a direct hedge or speculation on the benchmark-adjusted performance of a traded security (also referred to herein as a target component) vs. a benchmark (also referred to herein as a benchmark component). In addition, the computer or other computers can be configured to produce and administer corresponding financial products such as Exchange Traded Funds (ETFs), and derivative products such as listed or over the counter options and futures contacts, swaps, and other structured products that have valuations determined by or derived from the benchmark index.

Referring now to FIG. 2A, the relative performance index construction software 40 configures the computer system to receive 42 a selection of two distinct financial securities, trading on potentially the same or distinct named markets/exchanges, matching networks etc., whose prices and income distributions are publicly observable and available from markets/exchanges. Any two such distinct securities can be used. Typically, one of the securities will be a traded stock security, whereas the other one will be an underlying security such as an ETF that is based on a published index, and which is used as a benchmark (reference). Other benchmarks could include for example another, different stock security, an ETF that is based on another aspect of finance such as a currency based ETF and so forth. The software 40 also includes receiving 44 an adjustment factor that is either a constant or is determined by an algorithm based on publicly available inputs. From this information an index is calculated 46 and the index value is disseminated 48.

The ACRP index is a calculated benchmark-adjusted total performance index that corresponds to the traded security's performance relative to the performance of the benchmark over a period of time. Various indexes of traded securities vs. an underlying index (or other security) can be constructed for any combination of a traded security and a benchmark security. For illustrative purposes herein, the traded security is a stock security and the benchmark is an index exchange traded fund. For various traded securities, a family of ACRP indexes based on a particular benchmark M can be algorithmically determined. Conversely, for a particular security, various benchmark securities can be used to algorithmically determine a family of ACRP indexes for the particular security.

The construction 46 of an ACRP index given the above received 42 inputs is illustrated as follows. The traded security ("e.g., a stock") is denoted by the symbol S, while the benchmark, (e.g. an index ETF) is denoted by the symbol M. The published prices of the two securities on a day denoted by t are $P_{t,S}$ and $P_{t,M}$, respectively. The prices of the two publically securities on a day following day t, the following day, denoted as t+1, are $P_{t+1,S}$ and $P_{t+1,M}$, respectively. The income (e.g., dividends, bond coupons, etc.) from security S earned and distributed between days t and t+1 is denoted by $D_{t+1,S}$. Similarly, the income (e.g., dividends, bond coupons, etc.) from the underlying security M earned and distributed between days t and t+1 is denoted by $D_{t+1,M}$.

Each ACRP index is periodically calculated. In one implementation discussed below it is calculated at the close of trading and disseminated. In other implementations, described below it is calculated, e.g., continuously, (every minute, second or other intervals), and disseminated, e.g., continuously (at corresponding intervals) as follows.

For a given day, e.g., at the close:
If the value of the ACRP index on day t was $I_t$, then the value of the ACRP index on day t+1 will be determined 46 as:

$$I_{t+1} = I_t \times \frac{P_{t+1,S} + D_{t+1,S}}{P_{t,S}} \times \left(\frac{P_{t,M}}{P_{t+1,M} + D_{t+1,M}}\right)^{\beta_t}$$

where $\beta_t$ is the adjustment factor mentioned above and can be set to be a constant or is algorithmically determined according to a pre-determined algorithm that only uses information available as of date t. An example of setting $\beta_t$ to be constant is to have it set to always be equal to one.

An example of where $\beta_t$ is set according to an algorithm is given by:

$$\beta_t = 1 - \frac{1}{\sigma_{M,t}^2 \tau} \ln\left(\frac{F_{t,t+\tau}}{I_t}\right),$$

where $\sigma_{M,t}$ is the implied volatility inferred from at-the-money options on the underlying benchmark index, $F_{t,t+\tau}$ is the futures price associated with the nearest-to-maturity "out-performance index" (i.e., ACRP index with β=1) between the stock and the underlying benchmark index, and τ is the time to maturity for the futures contract.

In this latter example, the adjustment factor $\beta_1$ is determined by the prices of derivative products on other relative performance indexes that are first brought to market. In particular, a single pair of a traded security and an underlying benchmark could be associated with several ACRP indexes some of which employ a constant adjustment factor while others of which employ an algorithm driven adjustment factor. The availability of multiple performance adjusted ACRP indexes allows different market participants the flexibility to invest in the underlying ACRP related products according to a family of strategies (each ACRP index corresponding to a distinct strategy).

Alternatively, the adjustment factor can be selected to take into consideration the correlation of the first security to the benchmark security. Other adjustment factors could be developed.

In an further alternative, the value of the ACRP index on day t+1 can be determined using information available on t+1 for the adjustment factor as:

$$I_{t+1} = I_t \times \frac{P_{t+1,S} + D_{t+1,S}}{P_{t,S}} \times \left(\frac{P_{t,M}}{P_{t+1,M} + D_{t+1,M}}\right)^{\beta_{t+1}}$$

where $\beta_{t+1}$ is the adjustment factor mentioned above and can be set to be a constant or is algorithmically determined according to a pre-determined algorithm. An example of setting $\beta_{t+1}$ to be constant is to have it set to always be equal to one.

An example of where $\beta_{t+1}$ is set according to an algorithm is given by:

$$\beta_{t+1} = 1 - \frac{1}{\sigma_{M,t}^2 \tau} \ln\left(\frac{F_{t,t+\tau}}{I_t}\right),$$

On its initial day of inception, the ACRP index is normalized to an arbitrary value, $I_0$. Thus, the ACRP index value $I_{t+1}$ on day t+1 is determined by multiplying the index value $I_t$, the value of the ACRP index on the preceding day by two ratios. The first ratio is the ratio of the sum of price $P_{t+1,S}$ of the publically traded security S on day denoted by t+1 and the income $D_{t+1,S}$ (e.g., dividends, bond coupons, etc.) from security S earned and distributed between days t and t+1, divided by the price $P_{t,S}$ of the publically traded security on day t. The second ratio is the ratio of the price $P_{t,M}$ of the underlying benchmark security M on day t divided by the sum of the price $P_{t+1,M}$ of the publically traded underlying benchmark security, on day t+1, and the income $D_{t+1,M}$ (e.g., dividends, bond coupons, etc.) from underlying benchmark security M earned and distributed between days t and t+1. The second ratio is raised by an exponent corresponding to the adjustment factor, mentioned above ($\beta_{t+1}$) that is either a constant or determined from an algorithm whose form is made available to market participants before the initial day of index inception.

The ACRP index is periodically, i.e., daily (e.g., regular trading days) calculated 46 and disseminated 48 over the networked system 10. Each security traded in a market place can have a corresponding ACRP index, benchmarked to (reference security) an index of market activity, selected from any of a number of different market/exchange traded securities based on an underlying benchmark index such as, e.g., the NASDAQ 100, the S&P 100, etc.

Referring now to FIG. 2B, from the ACRP index, described above the corresponding ETF and/or derivative instruments, such as futures and option contracts, are produced 60. These instruments are issued 62 for trading on exchanges/markets, matching networks or private networks and the like.

Derivative instruments such as options and futures contracts are produced and represented in data structures, or the like. Such data structures include fields that describe the type of derivative instrument selected from the group of option and futures contracts, fields that denote settlement dates or expiration dates of the derivative instruments and fields that denote strike or mark to market prices for the derivative instruments, as appropriate. Other fields can be included such as fields that hold historical pricing information or are linked to historical pricing information for the ACRP index and so forth.

The disclosed arrangements allow investors to directly hedge or speculate on the benchmark-adjusted performance of a particular security. Using publicly available data, values for the family of ACRP indexes for each of a number of different securities as discussed above are calculated and disseminated daily. For each index, futures and options contracts whose payoffs are determined by the level of the ACRP index are produced and traded on an exchange and/or market.

Figure 2C:
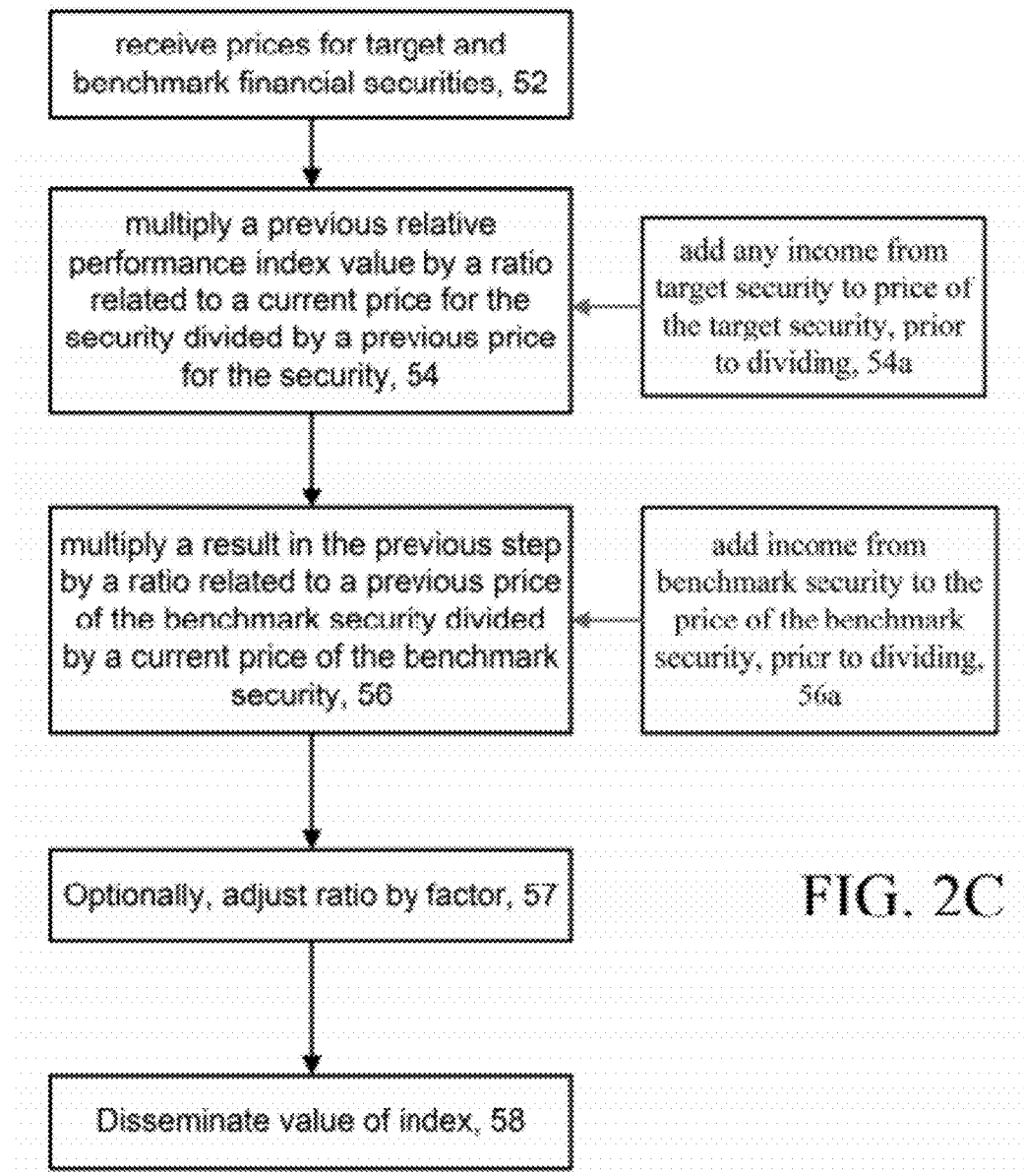

Referring now to FIG. 2C, a value for the relative performance index is determined via the one of the computers. The computers receive 52 prices of the target security and the benchmark security. The value of the relative performance index is determined by multiplying 54 a previous relative performance index value by a first ratio related to a current price for the security divided by a previous price for the security, and multiplying that result by a second ratio related to a previous price of the benchmark security divided by a current price of the benchmark security. The prices of the benchmark and target security can also add 54a, 56a any income from either the security or the benchmark security to the respective prices of the respective securities, prior to dividing. The second ratio can be optionally adjusted 56c by an exponent that corresponds to an adjustment factor for the second ratio.

Futures Contracts

Figure 3:
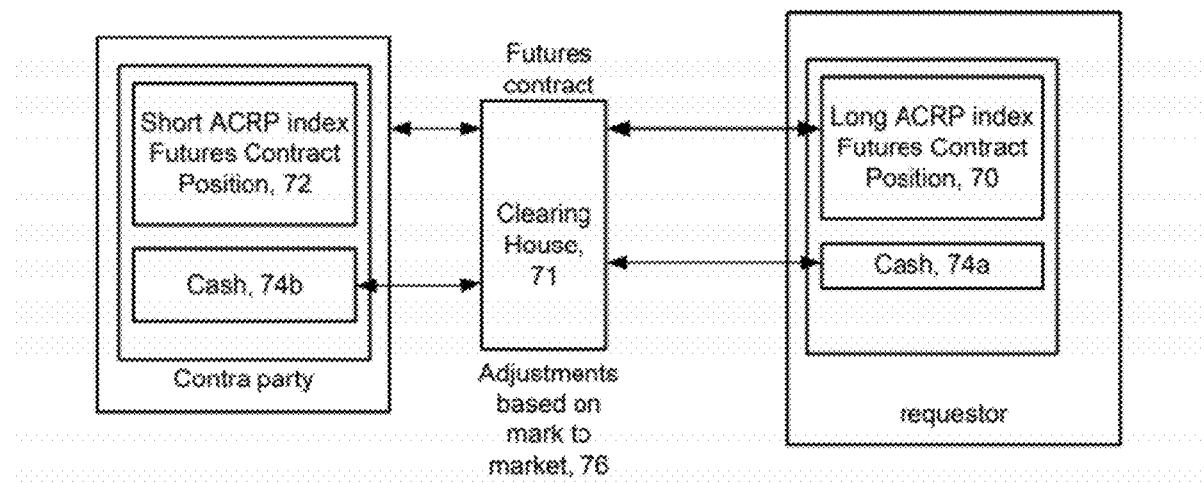
FIG. 3 is a diagram depicting formation of futures contract positions.

Referring now to FIG. 3, in order to facilitate creation of futures contracts, futures positions are established between a contra-party and a requestor using a clearing house 71. The requestor establishes 70 a long (or short) index (the "ACRP index") futures contract position while the contra-party establishes 72 the opposite, (i.e., a short or long) ACRP index futures contract position. Because the long and short positions are used to determine future credits/debits, no money (other than applicable fees) need be exchanged between the clearing house 71 and the requestor and contra side parties during formation of the long and short ACRP index futures contract positions. Both the long and short ACRP index futures contract positions are established based on a "mark to market price" for the underlying ACRP index on the day the contracts are formed. Money is subsequently, e.g., electronically exchanged 76 between accounts 74a, 74b of the requestor and the contra-party based on differences between the current day's futures settlement price and the previous trading day's futures settlement price of the ACRP index futures contract.

Index futures prices are tracked by the computer system such that an accurate value can be known and reported. On the final settlement date (i.e., maturity date) of a futures contract, the futures price equals the value of the corresponding ACRP index. Thus, the mark-to-market price of the futures contract is always related to market expectations about the value of the ACRP index at final settlement.

Figure 3A:
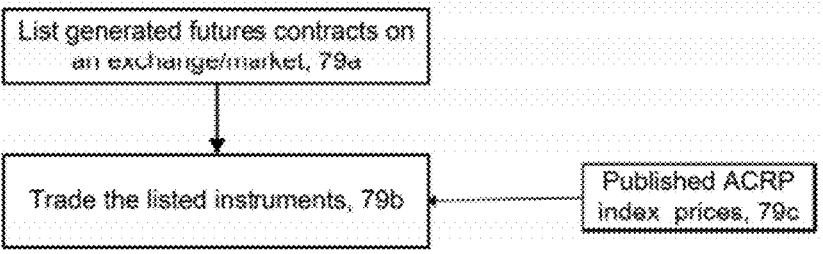
FIG. 3A is a flow chart.

Referring now to FIG. 3A, after initial formation and purchase of the futures contracts, the futures contracts can be traded using an exchange, a securities market, an electronic communication network (ECN), matching network or other trading venues according to any applicable regulations. In order to facilitate open trading of such contracts, the futures contracts are listed 79a and traded 79b on one or more securities exchanges, markets and/or through the matching facilities of one or more electronic communication networks (ECNS) or on commodity exchanges according to any applicable regulations. Secondary market trading will be at prices governed by competitive supply and demand forces taking into consideration, among other factors, the prevailing value of the ACRP index, which is periodically published 79c.

Options Contracts

Figure 4:
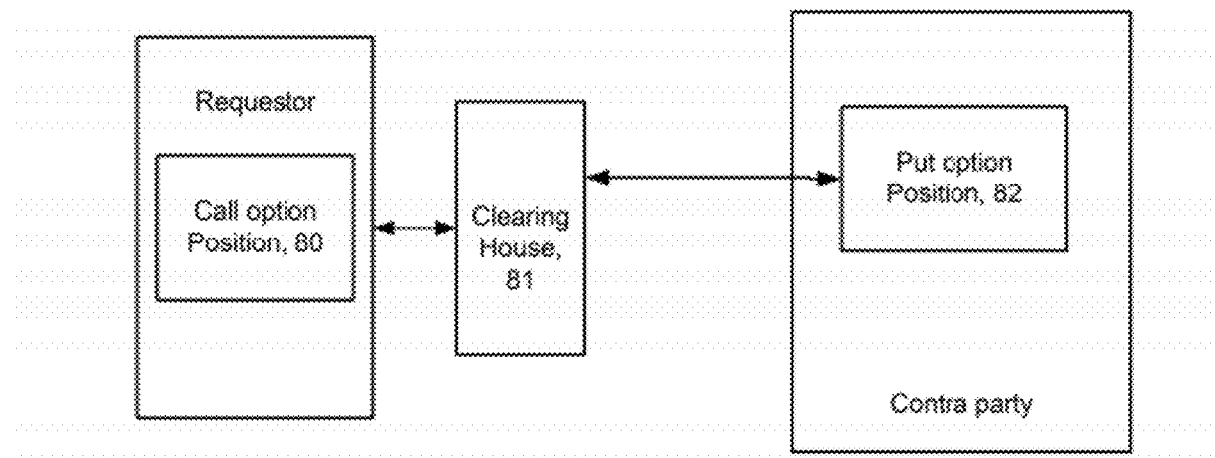
FIG. 4 is a diagram depicting formation of options contract positions.

Referring now to FIG. 4, in order to facilitate creation of option contracts, call 80 and put options positions 82 are established with a requisite cash amount, via a clearing house 81. Both the call and put index options positions are established based on the same "strike price" for the options contracts. On the expiration date for the options contracts, if the value of the index is greater than the strike price, money is transferred to the call option buyer from the call option seller, via the clearing house 81. Similarly, if the index is below the strike price, money is transferred to the put option buyer from the put option seller.

Option contracts are valued based on the price of the ACRP index. Strike prices for the option contracts are set to bracket the ACRP index in, e.g., one dollar (or other currency) point increments. The interval between strike prices in this example is no less than $1.00. Series can be listed at $1 or greater strike price intervals for each option, with at least two strike prices above and two strike prices below the current value of each ACRP Index option at about the time a series is opened for trading.

Bids and Offers in index options are expressed in terms of dollars and decimal equivalents of dollars per unit of the index (e.g., a bid of 5.50 would represent a bid of $5.50 per unit). Trading in an ACRP Index option may be halted whenever trading on the primary market in one of the Alpha Pair components is halted or suspended.

Margin

The exchange or trading venue or other entity sets customer margin levels for ACRP Index derivative products such as futures or options at the level of the higher of the margin required for such products on the target component or the margin required for the benchmark component. Other margin requirements are possible.

Below is a more detailed description pertaining to option contract based products.

Figure 4A:
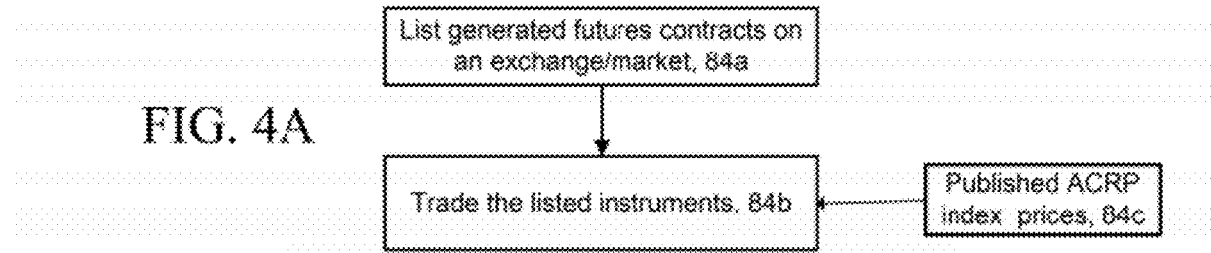
FIG. 4A is a flow chart.

Referring now to FIG. 4A, as an example, after purchasing of an options contract, the options contract can be traded using an exchange, a securities market, an electronic communication network (ECN), matching network, and other trading venues. In order to facilitate open trading, the option contract is listed 84a and traded 84a on one or more securities exchanges, markets and/or through the matching facilities of one or more electronic communication networks (ECNS) or they can be traded on commodity exchanges. Secondary market trading will be at prices governed by competitive supply and demand forces taking into consideration, among other factors, the values of the ACRP index, which is periodically published 84c.

For an ACRP index call option, the payoff at expiration to a holder of a long ACRP index call option is:

| Payout | condition |
|--------|-----------|
| V − X | if V > X |
| 0 | if V = X |
| 0 | if V < X | where V is the value of the ACRP index at expiration of the ACRP index call option and X is the strike price for the ACRP index call option.

For a put ACRP index option, the payoff at expiration to a holder of a long ACRP index put option is:

| Payout | condition |
|--------|-----------|
| 0 | if V > X |
| 0 | if V = X |
| X − V | if V < X | where V is the value of the ACRP index at expiration of the option and X is the strike price for the option.

Figure 5:
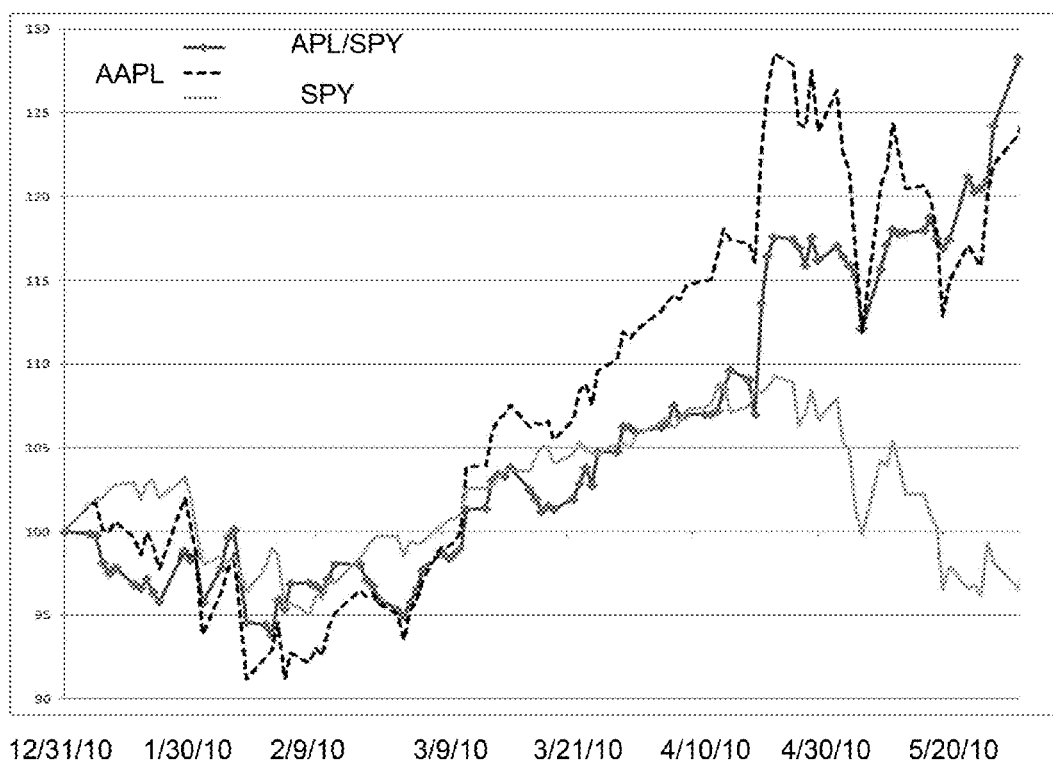
FIG. 5 is a graph showing performance of a constructed relative performance index vs. a benchmark security and a traded security.

Referring now to FIG. 5, an exemplary plot is illustrated showing an exemplary performance of a constant β=1 Index using Apple Inc. (AAPL) that trades on NASDAQ®, and the ETF SPY (SPDR® S&P 500® (ETF) (AMEX®)) trading on the NYSE®. For illustration purposes, applicable data were taken from Yahoo!Finance. The index is initially set to 100 upon closing on Dec. 31, 2009. On the same day, AAPL and SPY closed at $210.73 and $114.44, respectively. On the next trading day, Jan. 4, 2010, AAPL and SPY closed at $214.01 and $113.33, respectively and no dividends were paid by either security. On Jan. 4, 2010, the Index would have closed at:

$$I_{APPL/SPY \atop 1/4/10} = 100 \times \frac{\$214.01 + 0}{\$210.73} \times \left(\frac{\$114.44}{\$113.33 + \$0}\right)^{\beta=1} = 102.55$$

A plot of this ACRP Index (AAPL/SPY β=1 ACRP Index initialized to 100 on Dec. 31, 2009) between the initialization date of Dec. 31, 2009 and Jun. 1, 2010 is shown against plots of the total return indexes for AAPL and SPY, respectively.

Using conventional techniques assume that on Apr. 29, 2010 an investor chose to take a position that AAPL would outperform the market represented by SPY over the next month. Conventionally, the investor would enter into a one-month futures position on AAPL or purchase a one-month at-the-money AAPL call option. The price of AAPL stock on Apr. 29, 2010 was $127.48 and fell to $121.90 by May 28, 2010, a decline of 4.38%. The price of SPY shares (which tracks the S&P 500 market benchmark) on Apr. 29, 2010 was $108.45 and fell to $98.14 by May 28, 2010, a decline of 9.51%.

As the investor believed, AAPL outperformed the market as represented by SPY, but had the investor entered the futures or call option positions he or she would have still lost money because both products namely the call and the futures position on AAPL had declined in value over that period.

On the other hand, the AAPL/SPY β=1 ACRP index, as constructed above would have been 117.54 on Apr. 29, 2010 and rose to 124.21 by May 28, 2010. Any futures position undertaken on this ACRP index on Apr. 29, 2010 or a purchased at-the-money one-month call option would have led to significant gains justifying the investor's belief that AAPL would have outperformed the market.

An ACRP Index, together with derivative products whether exchange-traded futures and options contracts, allows investors to take precise hedging or speculation positions on a specific stock relative to a specific benchmark security. Stock portfolio indexes such as the S&P 500 Index, NASDAQ 100 and so forth can be used as well as options/futures on such indexes; leveraged and reverse leveraged ETFs and options/futures on such products also can be used as the benchmark security.

These products permit investors to purchase exchange-traded derivative instruments that allow them to earn benchmark-adjusted payoffs. These ACRP Index based products enable investors to efficiently and cheaply trade a family of benchmark-adjusted payoff derivatives.

Conventionally, in order to achieve such payoffs, investors could engage in a set of complicated and costly dynamic trading strategies. These conventional strategies have many drawbacks as will be discussed.

The exchange/market on which these ACRP index products trade calculates, posts, and updates the ACRP index, and earns a revenue stream as an information vendor of the indexes. In addition, the exchange/market can earn a fee (directly or through licensing) from options and futures trading based on the family of ACRP indexes described.

Figure 6:
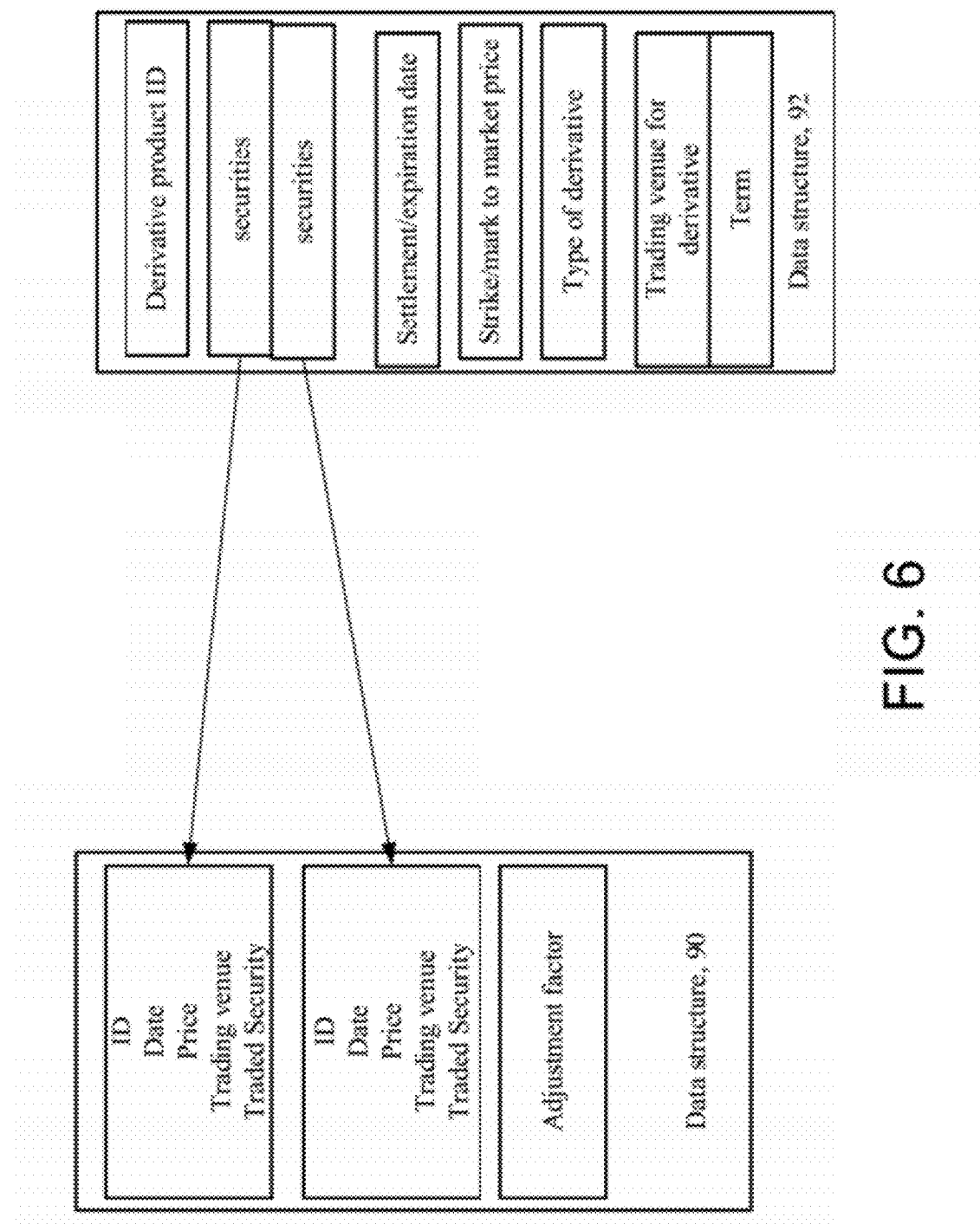
FIG. 6 is a pictorial diagram depicting data structures.

Referring now to FIG. 6, exemplary data structures 90, 92 that can be stored in memory or storage and are used with application programs 40 to construct ACRP index, manage such ACRP indexes, administer products derived from such indexes and so forth are shown. One of the data structures 90 includes a field that identifies the ACRP index. Also included is a set of fields for each of the pair of securities. Each field in the set typically includes a security identifier, a market/exchange where the security is traded, and a date corresponding to a price of the security on that date, as well as the price of the security on that date. The data structure also includes an adjustment factor.

Also shown in FIG. 6, is another exemplary data structure 92 that can be stored in memory or other storage and is used with application programs to manage trading of derivative instruments based on the ACRP index and which includes either a derivative product identifier and/or a set of fields for each of the pair of securities, as in the above data structure.

Each field in the set typically includes a security identifier, a market/exchange where the security is traded, and a date, as well as a price of the security on that date, and possible pricing history. The data structure could also include the adjustment factor used in the index.

In addition, the data structure 92 also includes the settlement/expiration date of the derivative instrument, the type of derivative instrument and the initial strike/mark price of the derivative instrument, trading venue for the derivative instrument, etc., as appropriate for the particular derivative instrument. The above data structures can include either the data or links to data for the respective fields.

Exchanges, markets and dealer matching networks could post similar or identical indexes and/or offer exchange-traded futures/options linked to the type of indexes discussed herein.

A difference between the value of the derivative instruments purchased by an investor and sold by the investor corresponds to the gain/loss for the investor. Thus, these derivative contracts are cash-settled. The net profit gained in futures contracts is periodically distributed (as credits and debits), e.g., daily to the holders of the respective positions of the futures contracts.

In the event that the value of an ACRP Index constructed to measure the relative performance of one security or index in relation to another security or index falls to zero or below, the value of the ACRP Index can be adjusted by a reporting authority to zero or at some economically nominal (i.e., relatively small) positive number. Alternatively, such an ACRP index could be de-listed if the value falls to zero or below. If a reference security is eliminated as the result of a cash-out merger or other event, the reporting authority may cease to publish that particular ACRP Index. In that case, the exercise settlement value of the options are fixed based upon the last published value for the ACRP Index, and the exchange or market on which such options are traded may determine to accelerate the expiration date for such options or keep the original expiration date.

EXAMPLE

The following example illustrates algorithmically constructed relative performance indexes calculation for a stock, e.g., "ABC" vs. SPY using an adjustment factor of β=1.

For both ABC and SPY, the previous trading day's closing market price is subtracted from today's closing market price with the result added to any dividend declared today as the "ex-dividend" date. For example, today's closing price for ABC (214.01) minus the previous day's closing price (210.73) equals 3.28. Today is not an ex-dividend date for ABC and therefore, nothing is added to 3.28. Similarly, today's closing price for SPY (113.33) minus the previous trading day's closing price (111.44) equals 1.89. Today is not an ex-dividend date for SPY and therefore, nothing is added to 1.89.

The result above is divided by the previous trading day's closing market price and the new result is rounded, using simple rounding to, e.g., four decimal places to yield the daily total return. For ABC, 3.28 is divided by 210.73 to yield a daily total return of 0.0156, whereas for SPY, 1.89 is divided by 111.44 to yield a daily total return of 0.0170.

The results above are added to the whole number one. For ABC, the daily total return of 0.0156 would be added to 1 for a result of 1.0156. For SPY the daily total return of 0.0170 would be added to 1 for a result of 1.0170.

In order to calculate the ACRP Index, the 1.0156 ABC value is divided by the 1.0170 SPY value and multiplied by the previous trading day's closing ACRP Index value. Thus, assuming in the example that the previous trading day's closing ACRP Index value was 100.00, today's closing ACRP Index value would be 99.86 (1.0156/1.0170×100.00=99.86). The 99.86 index level reflects that ABC's total return performance today versus yesterday was −0.14% relative to SPY.

Daily total return values and ACRP index values are updated based upon prices of, e.g., each reported transaction in the primary listing market. In the example above, closing prices are used simply for purposes of illustration.

Advantages in Trading of Relative Performance Index Derivatives

An investment in the relative performance index has less exposure to events that move the entire market compared to other investment strategies. With the above described ACRP index based products, an investor invests based only on the relative performance of a stock versus the applicable benchmark.

Conventional approaches have several difficulties in achieving such relative performance.

In a conventional approach, an investor takes a passive long position in a stock and finances this position with an equal passive short position in a benchmark ETF. Over a short period of time, such a position would provide similar benefits as investing in an ACRP Index, assuming the investor can easily short the ETF. However, over somewhat longer periods of time, the passive long-short position can become unbalanced and far riskier than the ACRP Index because there is no limit to the loss that can be incurred from the short position in the ETF.

On the other hand, an investor in the ACRP Index can only lose at most what was invested. A fundamental difference is that the long position in the ACRP Index carries with it the same risk as a portfolio that is always equally balanced between the long and short positions.

Additionally, shortly after setting up the passive long-short position in the stock and the benchmark, the value of the funds invested in the stock will no longer equal the value of the funds owed on the benchmark short position. In order to keep the relative positions even in the portfolio, the investor would have to dynamically rebalance the positions. The higher the volatility of the two securities the more rebalancing would have to take place. Such frequent rebalancing may be prohibitively expensive for the typical institutional or retail investor due at least to transaction costs. On the otherhand, investing in the ACRP Index does not entail such rebalancing thus offering distinct advantages to such investors.

To illustrate the differences between a buy-and-hold position in ACRP index products versus a buy-and-hold position in derivatives of the index constituents in somewhat more detail, consider an investor who wishes to buy a call option on the relative performance of the stock. While this may seem equivalent to buying a call option on the stock and selling a call option on the market, in practice it is not. The second strategy is far more risky than the first. In particular, the option on the index entails no worse loss beyond the amount used to buy option. By comparison, selling the option on the market ETF exposes the investor to unlimited loss. Moreover, the value of the long-short call position depends on the volatilities of the stock and the benchmark (each option depends on the volatility of its underlying only). By contrast, the value of the index option depends also on the correlation between the two assets. If the correlation changes but the volatilities do not, then the value of the index option will change but the value of the long-short option position will not.

Moreover, ACRP index products, such as options would be less expensive than stock option based strategies. The volatility of stock options are based on total risk of the stock (market risk and idiosyncratic risk), whereas ACRP index options are essentially based on the difference in risk between the stock and the benchmark. Because the relative performance options have lower volatility than stock options relative performance index options should be less expensive.

Relative performance index products are based on total return, which includes income distribution as well as price appreciation. ACRP products allow retail and professional investors to cheaply shift portfolio weights to and from different asset classes on a one-for-one basis. Other advantages are possible.

Continuous Update

A complex of relative performance indexes can be defined by the following "continuous" updating rule:

$$I(b)_{t+\Delta t} = I(b)_t \times \frac{\left(\frac{S_{t+\Delta t} + D_{S,t+\Delta t}}{S_t}\right)}{\left(\frac{M_{t+\Delta t} + D_{M,t+\Delta t}}{M_t}\right)^b} = I(b)_t \times \frac{R_{S,[t,t-\Delta t]}}{(R_{M,[t,t+\Delta t]})^b}$$

where b is a relative risk-adjustment coefficient. The term in the numerator $$\left(\frac{S_{t+\Delta t} + D_{S,t+\Delta t}}{S_t}\right)$$

is the total realized return of holding security S over the instant between t and t+Δt. The analogous term in the denominator $$\left(\frac{M_{t+\Delta t} + D_{M,t+\Delta t}}{M_t}\right)^b$$

is the total realized return of holding security M over the instant between t and t+Δt, raised to the power b. In practice, distributions are paid in discrete sums and thus the formula can only be approximately updated continuously. It is also worthwhile to note that the market risk coefficient (b) may be defined as a separate process $b_t$ or in some embodiments $b_{t+\Delta t}$ that is a function of economic observables and their history as of date t or in some embodiments t+Δt.

With relative performance so defined, it follows that a change in the log-index corresponds to the difference between the instantaneous performance of security S versus the scaled instantaneous performance of the benchmark security M, that is, $$\ln I(b)_{t+\Delta t} - \ln I(b)_t = \ln R_{S[t,t+\Delta t]} - b \ln R_{M[t,t+\Delta t]}$$

where b is the relative risk-adjustment. When b=0, the second term on the right hand side of (1) is zero and the ACRP Index is a total return index. When b=1, the right hand side of (1) corresponds to the ratio of the target and benchmark returns and is a relative performance index. This measure of outperformance is relative outperformance. The more usual definition of outperformance is the degree to which the price on the target exceeds the price of the benchmark, or absolute outperformance.

The system and methods described herein can be implemented in digital electronic circuitry, or in computer hardware, firmware, software, or in combinations thereof. For example, calculations can occur in server systems as shown in FIG. 1. Generation of indexes can be implemented using any technique. Also, data structures used to represent contents of indexes and financial instruments derived therefrom can be stored in memory and in persistent storage. The financial instruments derived therefrom can be represented by certificates or preferably as book entries in the records of an administrator or broker/dealer or clearing house or transfer agent or registrar either as manual entries or preferably as data structures in an administrator or a broker/dealer's computer systems.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Computer readable media are storage devices suitable for tangibly embodying computer program instructions include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer was shown in FIG. 1, which shows a block diagram of a programmable processing system (system) suitable for implementing or performing the apparatus or methods described herein. The system includes a processor, and memory, such as a random access memory (RAM), a program memory (for example, a writeable read-only memory (ROM) such as a flash, a hard drive controller and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer).

The hard drive controller is coupled to a hard disk suitable for storing executable computer programs, including programs embodying the present invention, and data including storage. The I/O controller is coupled by an I/O bus to an I/O interface. The I/O interface receives and transmits data in analog or digital form over communication links such as a serial link, local area network, wireless link, and parallel link.

While embodiments have been described in terms of products that are futures contracts or options contracts other embodiments are possible. For instance, it is possible that in other embodiments the benchmark security is another security such as a stock.

Thus, it is understood that particular embodiments have been described; however other embodiments are within the scope of the following claims.

What is claimed is:

1. A computer implemented method, comprising:
determining by one or more computers:
a value for a relative performance index, the relative performance index based on prices of a security and a benchmark security that is different from the security and with the security and the benchmark security traded on trading venues and having prices that are publicly observable and available from the respective trading venues; and
with the value of the relative performance index being determined by the one or more computers by:
multiplying, by the one or more computers, a previous relative performance index value by two ratios, the first ratio related to a current price for the security divided by a previous price for the security, and the second ratio related to a previous price of the benchmark security divided by a current price of the benchmark security.

2. The method of claim 1 further comprising:
adding by the one or more computers any income from either the security or the benchmark security to the respective current prices of the respective securities, prior to dividing.

3. The method of claim 1 further comprising:
raising by the one or more computers, prior to multiplying, the second ratio to the power of an adjustment factor for the second ratio.

4. The method of claim 3, further comprising:
assigning by the one or more computers the adjustment factor a constant value.

5. The method of claim 3, further comprising:
determining by the one or more computers the adjustment factor by an algorithm based on publicly available information.

6. The method of claim 1, wherein the one or more computers that determine a value for the relative performance index, determine values for plural relative performance indexes for corresponding plural, different pairs of traded securities and benchmark securities.

7. The method of claim 1, wherein the one or more computers periodically disseminate values for the relative performance index.

8. The method of claim 1, further comprising:
producing derivative contracts based on the relative performance index.

9. The method of claim 8, wherein the derivative contracts are futures contracts.

10. The method of claim 8, wherein the derivative contracts are options contracts.

11. A non-transitory computer program product tangibly embodied on a computer readable storage device, the computer program product for administrating benchmark indexes comprises instructions for causing a computer to:
determine a value for a relative performance index, the relative performance index based on prices of a security and a benchmark security that is different from the security,
receive prices for the security and the benchmark security based on trading of the securities on trading venues; and
multiply a previous relative performance index value by two ratios, the first ratio related to a current price for the security divided by a previous price for the security, and the second ratio related to a previous price of the benchmark security divided by a current price of the benchmark security.

12. The computer program product of claim 11, further comprising instructions to:
add any income attributable to either the security or the benchmark security to the respective current prices of the respective securities, prior to executing instructions to divide.

13. The computer program product of claim 11 further comprising instructions to:
raise, prior to multiplying, the second ratio to the power of an adjustment factor for the second ratio.

14. The computer program product of claim 13, further comprising instructions to assign the adjustment factor is a constant value.

15. The computer program product of claim 13, further comprising instructions to determine the adjustment factor by an algorithm based on publicly available information.

16. The computer program product of claim 11, further comprising instructions to:
determine values for plural relative performance indexes for corresponding plural, different pairs of traded securities and benchmark securities.

17. The computer program product of claim 11, further comprising instructions to cause one or more computers to periodically disseminate values for the relative performance index.

18. A non-transitory computer program product tangibly embodied on a computer readable storage device, the computer program product for administrating derivative contracts for benchmark indexes comprises instructions for causing a computer to:
receive a value for a relative performance index, the relative performance index value based on prices of a security and a benchmark security that is different from the security that is derived from multiplying a previous relative performance index value by two ratios, the first ratio related to a current price for the security divided by a previous price for the security, and the second ratio related to a previous price of the benchmark security divided by a current price of the benchmark security;
determine a first one of an initial strike price for option contracts or an initial mark to market price for futures contracts that are set to track a current value of the index in increments of currency; and
generate derivative contracts with an initial price that based at least in part on the value of the relative performance index.

19. The computer program product of claim 18, wherein the derivative contracts are futures contracts.

20. The computer program product of claim 18, wherein the derivative contracts are options contracts.

21. A computer system comprises:
a processor;
memory coupled to the processor;
a computer readable storage medium storing a computer program product for administrating benchmark indexes and derivative products comprises instructions for causing the computer to:
determine a value for a relative performance index, the relative performance index based on prices of a security and a benchmark security that is different from the security;
receive prices for the security and the benchmark security based on trading of the securities on trading venues;
multiply a previous relative performance index value by two ratios, the first ratio related to a current price for the security divided by a previous price for the security, and the second ratio related to a previous price of the benchmark security divided by a current price of the benchmark security.

22. The system of claim 21, wherein the computer program product further comprises instructions to:
add any income attributable to either the security or the benchmark security to the respective current prices of the respective securities, prior to executing instructions to divide.

23. The system of claim 21, wherein the computer program product further comprises instructions to:
raise, prior to multiplying, the second ratio to the power of an adjustment factor for the second ratio.

24. The system of claim 23, wherein the computer program product further comprises instructions to:
assign the adjustment factor a constant value.

25. The system of claim 23, wherein the computer program product further comprises instructions to:
determine the adjustment factor by an algorithm based on publicly available inputs.

26. The system of claim 21, wherein the computer program product further comprises instructions to:
determine values for plural relative performance indexes for corresponding plural, different pairs of traded securities and benchmark securities.

27. The system of claim 21, wherein the computer program product further comprises instructions to:
cause the system to periodically disseminate values for the relative performance index.

28. The system of claim 21, wherein the computer program product further comprises instructions to:
record derivative contracts based on the relative performance index.

29. The system of claim 28, wherein the derivative contracts are futures contracts.

30. The system of claim 28, wherein the derivative contracts are options contracts.

31. A computer implemented method comprises:
receiving by one or more computers a selection from an investor of two distinct securities, with one security being a target security and the other being a benchmark security;
determining by one or more computers a relative performance index based on prices of the target security and the benchmark security by multiplying by the one or more computes a previous relative performance index value by two ratios, the first ratio related to a current price for the security divided by a previous price for the security, and the second ratio related to a previous price of the benchmark security divided by a current price of the benchmark security; and
disseminating by the one or more computers values for the relative performance index.

32. The method of claim 31, further comprising:
adding by the one or more computers any income from either the security or the benchmark security to the respective current prices of the respective securities, prior to dividing; and
raising by the one or more computers, prior to multiplying, the second ratio to the power of an adjustment factor for the second ratio.

33. The method of claim 31, further comprising:
generating derivative products based on the relative performance index.

34. The method of claim 31, further comprising:
receiving by the one or more computers plural selections comprising plural pairs of distinct securities, with one security in each of the plural pairs being a target security and the other security in each of the plural pairs being a benchmark security; and
determining by the one or more computers corresponding relative performance indexes based on prices of the target security and the benchmark security for the pairs of securities.

35. A computer implemented method comprising:
receiving by one or more computers a selection from an investor of two distinct securities, with one security being a target security and the other being a benchmark security;
determining by the one or more computers a relative performance index based on prices of the target security and the benchmark security by:

$$I(b)_{t+\Delta t} = I(b)_t \times \frac{\left(\frac{S_{t+\Delta t} + D_{S,t+\Delta t}}{S_t}\right)}{\left(\frac{M_{t+\Delta t} + D_{M,t+\Delta t}}{M_t}\right)^b}$$

where b is a relative risk-adjustment coefficient, $$\left(\frac{S_{t+\Delta t} + D_{S,t+\Delta t}}{S_t}\right)$$

is the total realized return of holding security S over the time between t and t+Δt, and $$\left(\frac{M_{t+\Delta t} + D_{M,t+\Delta t}}{M_t}\right)^b$$

is the total realized return of holding security M over the time between t and t+Δt, raised to the power b; and
disseminating by the one or more computers values for the relative performance index.

36. The method of claim 35, further comprising:
assigning by the one or more computer the relative risk-adjustment factor a constant value.

37. The method of claim 35, further comprising:
determining by the one or more computer the relative risk-adjustment factor by an algorithm based on publicly available inputs.

* * * * *

UNITED STATES PATENT AND TRADEMARK OFFICE
CERTIFICATE OF CORRECTION

PATENT NO.      : 8,515,849 B2
APPLICATION NO. : 12/981825
DATED           : August 20, 2013
INVENTOR(S)     : Sagi et al.

It is certified that error appears in the above-identified patent and that said Letters Patent is hereby corrected as shown below:

Title Page, item (73) Assignee should read:

(73) Assignee:  The NASDAQ OMX Group, Inc., New York, NY (US)
                            Alpha Options, LLC, Nashville, TN (US)

Signed and Sealed this
Twenty-eighth Day of June, 2016

Michelle K. Lee
*Director of the United States Patent and Trademark Office*